United States Patent [19]

Kawaguchi et al.

[11] Patent Number: 5,225,280

[45] Date of Patent: Jul. 6, 1993

[54] METAL CONTAINING DERIVATIVES OF AMINOTRIAZINE POLYMER AND METHOD OF PREPARING SAME

[75] Inventors: Masayuki Kawaguchi, Ube; Koji Nozaki, Yamaguchi; Yasushi Kita, Ube, all of Japan

[73] Assignee: Central Glass Company, Limited, Ube, Japan

[21] Appl. No.: 524,040

[22] Filed: May 16, 1990

[30] Foreign Application Priority Data

May 24, 1989 [JP] Japan ................................. 1-130371
May 31, 1989 [JP] Japan ................................. 1-138076
Jun. 12, 1989 [JP] Japan ................................. 1-149140
Jun. 30, 1989 [JP] Japan ................................. 1-167019

[51] Int. Cl.$^5$ ............................................. B32B 5/16
[52] U.S. Cl. ................................. 428/403; 428/407
[58] Field of Search ............................. 428/403, 407

[56] References Cited

PUBLICATIONS

Kohbunshi (a Japanese journal), vol. 38, Mar., 1989, pp. 196–199 Y. Yuki, "Preparation and Polymerization of Vinyl Compounds Containing Triazine Rings".

Primary Examiner—Paul J. Thibodeau
Assistant Examiner—D. S. Nakarani
Attorney, Agent, or Firm—Keck, Mahin & Cate

[57] ABSTRACT

Metal containing compounds having a graphite-like layer structure are derived from poly(amino-s-triazine), [A], which has a layer structure and is represented by $(C_3N_3)_2N_xH_y$, where $2 \leq x \leq 4$, and $0 \leq y \leq 8$. Reaction of [A] with a transition metal M at 400°–1000° C. gives a compound represented by $C_aNH_bM_c$, where $0.6 \leq a \leq 20.0$, $0 \leq b \leq 1.0$, and $0.001 \leq c \leq 0.5$. This compound exhibits magnetism. Reaction of [A] with a halide of a transition metal or aluminum at 200°–500° C. gives $C_6N_pH_qM_rX_s$, where M is a transition metal or Al, X is a halogen, $8 \leq p \leq 10$, $0 \leq q \leq 10$, $0.6 \leq r \leq 1.5$, and $0 \leq s \leq 1$. When M is a transition metal the compound exhibits paramagnetism. When X is Al, heating of a powder of the compound at 800°–950° C. provides an AlN powder coated with an amorphous organic substance composed of C, N and H and, hence, protected against oxidation. The same coated AlN powder is obtained also by reacting a powder of [A] with an aluminum halide at 800°–950° C. By heating the coated AlN powder at a temperature above 1000° C. the amophous organic coating sublimates and decomposes to leave a pure AlN powder which is suitable for sintering.

6 Claims, 9 Drawing Sheets

10 μm

METAL CONTAINING DERIVATIVES OF AMINOTRIAZINE POLYMER AND METHOD OF PREPARING SAME

BACKGROUND OF THE INVENTION

This invention relates to novel compounds having a graphite-like layer structure and containing a metal element and methods of preparing the novel compounds from poly(amino-s-triazine).

s-Triazine ring has six $\pi$-electrons, and the six atoms (three carbon atoms and three nitrogen atoms) that constitute the ring are in the same plane. Melamine resins have s-triazine rings in their molecules, but melamine resins are amorphous since the triazine rings are linked three-dimensionally disorderly. There is a report on copolymers of vinyl amino-s-triazine compounds with styrene, acrylic acid metacrylic acid or methyl methacrylate (Kohbunshi, 38, 196-199 (1989)), but these copolymers belong to linear polymers.

Recently we have developed poly(amino-s-triazine) which is a novel polymeric compound having a graphite-like layer structure with s-triazine rings two-dimensionally linked in each layer, as disclosed in copending U.S. patent application Ser. No. 07/378,914, now U.S. Pat. No. 5,023,308 filed Jul. 12, 1989 (will be referred to as the prior application). The two-dimensional structure of poly(amino-s-triazine) is presumed to be represented by the following structural formula, which is shown in the prior application.

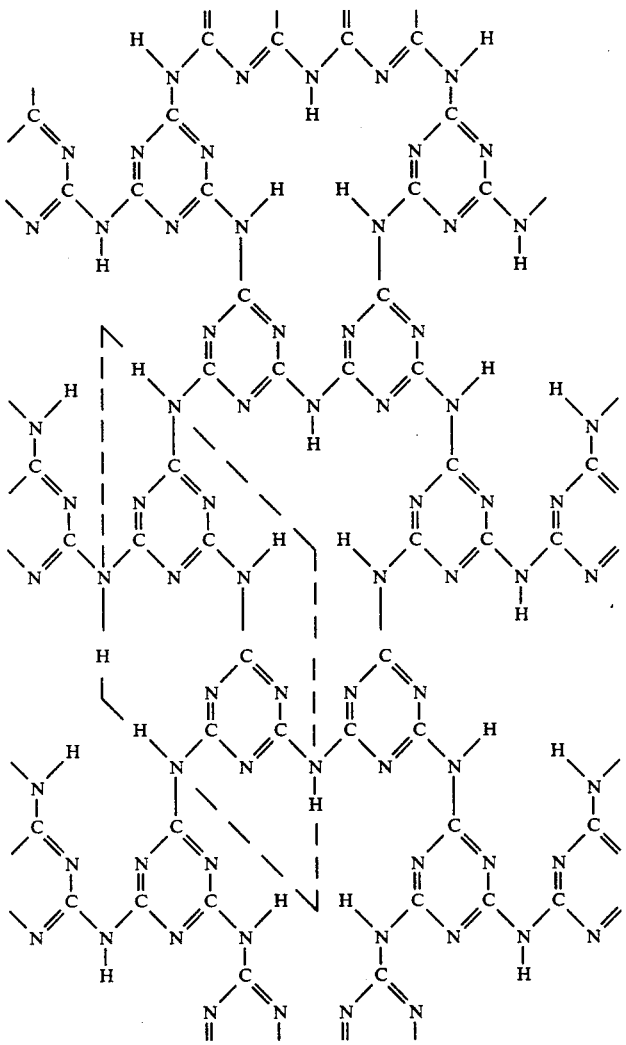

In the above formula the parallelogram in broken line indicates unit cell.

As can be seen in the structural formula, in the unit cell of the two-dimensional structure of each layer of poly(amino-s-triazine) there is a hole surrounded by three >NH radicals. The hole is 0.394 nm in diameter. The prior application further discloses that an alkali metal can be introduced into this hole to provide a modified polymer containing an alkali metal. Poly(amino-s-triazine) and the alkali metal containing modification are interesting as fluorescent materials or as semiconductive materials.

SUMMARY OF THE INVENTION

It is an object of the present invention to provide novel compounds having a graphite-like layer structure fundamentally constituted of carbon and nitrogen and containing a transition metal or aluminum.

It is another object of the invention to provide methods of preparing such novel compounds.

First, the present invention provides a compound having a layer structure with a structural unit represented by the general formula (1):

$$C_a NH_b M_c \quad (1)$$

wherein M is a transition metal, $0.6 \leq a \leq 20.0$, $0 \leq b \leq 1.0$, and $0.001 \leq c \leq 0.5$.

A compound represented by the general formula (1) is prepared by reacting poly(amino-s-triazine), which has a layer structure with a structural unit represented by the general formula (A), with a transition metal or an alloy thereof in an inactive gas atmosphere at a temperature in the range from 400° to 1000° C.:

$$(C_3N_3)_2 N_x H_y \quad (A)$$

wherein $2 \leq x \leq 4$, and $0 \leq y \leq 8.0$.

It is preferred to use a transition metal that exhibits magnetism. In the novel compounds the transition metal bonds to carbon or nitrogen so that the compounds are nonmetallic materials. However, the novel compounds containing a magnetic metal exhibit paramagnetism.

The particulars of the structure of the novel compounds depend on the kind of the introduced transition metal. For example, when the transition metal is Ni, Co or Mn the triazine rings of the starting poly(amino-s-triazine) are mostly modified by bond of the transition metal to carbon or nitrogen of triazine ring. When the metal is Fe some of the triazine rings remain unchanged in the novel compound, and there is a possibility that some of Fe atoms enter the aforementioned holes in the planar structure of poly(amino-s-triazine).

When a powder of a transition metal is reacted with poly(amino-s-triazine), the powder is coated with a novel compound containing the transition metal. That is, the core of each particle of the obtained powder is the transition metal in elementary form. The novel compound on the surface is high in acid resistance so that the treatment of the obtained powder with an ordinary acid does not affect the transition metal core.

The transition metal containing novel compounds are stable in the air and will be useful in magnetic fluids, novel tonors for electrophotographic or copying devices, electromagnetic wave absorbers, conductive paints, catalysts, protective films for magnetic information storage disks, etc.

Further, the invention provides a compound having a layer structure with a structural unit represented by the general formula (2):

$$C_6 N_p H_q M_r X_s \quad (2)$$

wherein M is a transition metal, X is a halogen, $8 \leq p \leq 10$, $0 \leq q \leq 10$, $0.6 \leq r \leq 1.5$, and $0 \leq s \leq 1$.

A compound represented by the general formula (2) is prepared by reacting poly(amino-s-triazine) represented by the general formula (A) with a transition metal halide in an inactive gas atmosphere at a temperature in the range from 200° to 500° C.

The compounds represented by the general formula (2) retain the skeleton of poly(amino-s-triazine). In these compounds it is probable that the transition metal M enters the aforementioned hole in the unit cell of poly(amino-s-triazine). It is evident that the transition metal is not merely dispersed in poly(amino-s-triazine) since ESCA spectra of a compound of the general formula (2) show clear shifts of peaks by comparison with ESCA spectra of the transition metal itself. The halogen X of the transition metal halide is partly lost as an acid is formed by reaction of the halogen with hydrogen of >NH radicals surrounding the aforementioned hole, but a portion of the halogen is taken into the hole together with the transition metal. When the transition metal M is a magnetic metal, the compound represented by the general formula (2) exhibits paramagnetism.

The compounds represented by the general formula (2) are stable in the air and hardly absorb moisture. These compounds will be useful as magnetic materials or as catalysts.

Furthermore, the invention provides a compound having a layer structure with a structural unit represented by the general formula (3):

$$C_6 N_p H_q Al_r X_s \quad (3)$$

wherein X is an acid radical, $8 \leq p \leq 10$, $0 \leq q \leq 10$, $0.6 \leq r \leq 1.5$, and $0 \leq s \leq 1$.

A compound represented by the general formula (3) is prepared by reacting poly(amino-s-triazine) represented by the general formula (A) with an aluminum salt of an acid in an inactive gas atmosphere at a temperature in the range from 200° to 500° C.

The structure of the aluminum containing compound is fundamentally similar to the structure of a transition metal containing compound represented by the general formula (2). That is, Al is taken into the hole in the unit cell of poly(amino-s-triazine) together with a portion of the acid radical X of the aluminum salt subjected to reaction.

A compound represented by the general formula (3) is stable in the air up to a temperature of about 500° C. This compound serves as a precursor of aluminum nitride AlN. That is, when a powder of this compound is heated in an inactive gas atmosphere at a temperature in the range from 800° to 950° C. the powder turns into an AlN powder coated with an amorphous organic substance composed of C, N and H. In this organic substance the atomic ratio of N to C is up to 1.5, and the atomic ratio of H to C is up to 1.0. The amorphous organic coating protects the aluminum nitride core against oxidation. An aluminum nitride powder having the same coating can be obtained also by reacting a powder of poly(amino-s-triazine) with an aluminum salt of an acid in an inactive gas atmosphere at a temperature in the range from 800° to 950° C.

When the coated AlN powder is heated to a temperature above 1000° C. the amorphous organic coating readily sublimates and decomposes, whereby the powder turns into a pure AlN powder. Since the amorphous organic substance is composed of reducing elements, the sublimation and decomposition of the coating does not leave oxygen on the surface of the resultant AlN powder. By using the coated AlN powder according to the invention it is easy to produce a sintered AlN ceramic sufficiently high in heat conductivity, because sintering of oxygen-free AlN can be accomplished by making heat treatment of the coated powder at a temperature above 1000° C. just before compacting the powder or by making a similar heat treatment after shaping the powder into a green body but before sintering the green body.

An important feature of sintered AlN ceramics is being high in heat conductivity. However, use of an AlN powder containing oxygen results in lowering of the heat conductivity of the sintered ceramic. Even though AlN powder is prepared with care not to retain oxygen, the AlN powder is liable to undergo partial oxidation during storage in the air. The oxidation of AlN powder may be prevented by a surface treatment, but this is inconvenient and economically unfavorable. In this regard it is advantageous to use the coated AlN powder according to the invention.

To produce the amorphous organic coating according to the invention it is necessary to intermediately form a compound represented by the general formula (3). It is impossible to obtain the same organic substance by reacting an aluminum compound with a monomeric compound containing carbon and nitrogen such as melamine.

Still further, the invention provides a method of preparing $MgCN_2$ or $ZnCN_2$. The method comprises reacting poly(amino-s-triazine) represented by the general formula (A) with elementary Mg or Zn or with a magnesium or zinc halide in an inactive gas atmosphere at a temperature in the range from 600° to 1000° C.

$MgCN_2$ and $ZnCN_2$ are useful as raw materials of fertilizers, herbicides and some nitrogen compounds.

DETAILED DESCRIPTION OF THE INVENTION

Figure 1:
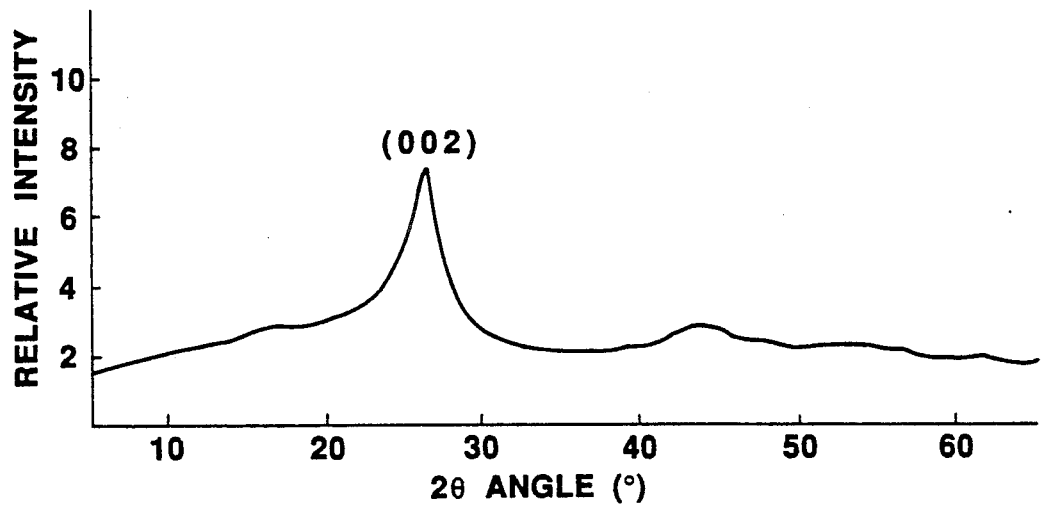
FIG. 1 shows X-ray diffraction pattern of a nickel compound according to the invention.

As disclosed in the prior application, poly(amino-s-triazine) having a layer structure with a structural unit represented by the general formula (A) is obtained by reacting cyanuric trichloride with ammonia or melamine. It is possible to directly form poly(amino-s-triazine) by reacting gasified cyanuric trichloride with ammonia gas at a temperature ranging from 400° to 600° C. However, it is rather favorable to employ a two-stage process having the steps of first reacting solid or melted cyanuric trichloride with ammonia or melamine at a temperature lower than 400° C. to form a chlorine-containing oligomeric compound as an intermediate and then heating the intermediate in an inactive gas at a temperature ranging from 400° to 600° C. to thereby obtain the aimed poly(amino-s-triazine).

Poly(amino-s-triazine) is a white or yellowish white solid at room temperature and is stable in the air up to a temperature near 400° C.

In preparing a transition metal compound represented by the general formula (1), $C_aNH_bM_c$, it is preferred to select Ni, Fe, Co or Mn as the transition metal M. Also it is suitable to use a stainless steel as an alloy of transition metals.

The aimed metal compound is obtained by heating a mixture of poly(amino-s-triazine) and the selected transition metal in powder or sheet form in an inactive gas atmosphere or by sublimating poly(amino-s-triazine) and bringing the vapor into contact with the transition metal at an elevated temperature. The reaction is carried out at a temperature in the range from 400° to 1000° C. At temperatures below 400° C. the reaction hardly proceeds. At temperatures above 1000° C. the reaction product readily undergoes carbonizing decomposition. A preferred range of the reaction temperature is from 500° to 700° C.

In this reaction it is suitable that the proportion of poly(amino-s-triazine) to the transition metal is from 0.1:1 to 20:1 by weight. If the proportion of the polymer is less than 0.1 a considerable portion of the metal remains unreacted, and if the proportion of the polymer is more than 20 a considerable portion of the polymer remains unreacted.

The aimed transition metal compound is obtained in the form of powder, film or whiskers depending on the form of the reactants and the manner of the reaction. The obtained compound has a black color when the metal is Ni, Co or Mn and a brown color when the metal is Fe. In the case of using a nickel-chromium stainless steel as an alloy of transition metals the obtained compound has a brownish or purplish color, and in this case it is possible to obtain the metal compound in the form of a semitransparent film.

EXAMPLE 1

Together with a powder of poly(amino-s-triazine) a strip of nickel sheet 4 cm in length, 1 cm in width and 200 μm in thickness was placed in a reaction tube made of quartz, and the reaction tube was kept heated at 700° C. for 1 hr while nitrogen gas was passed through the tube. After this operation there was no visible change in the shape of the strip of the nickel sheet, but there was a black powder on the the nickel sheet, and beneath the powder the nickel sheet was laid with a black film.

The black powder could easily be detached from the nickel sheet. This powder adhered to magnet and exhibited paramagnetism. Elementary analysis of the black powder gave the result shown in Table 1. The analysis indicates that the composition of this product is $C_{6.5}NH_{0.7}Ni_{0.14}$. FIG. 1 shows X-ray diffraction pattern of the obtained nickel compound. There is a somewhat broadened peak at the position of the (002) diffracted line of graphite. However, IR absorption spectrum of this nickel compound exhibited little absorption bands and, hence, indicated that the skeleton of the starting poly(amino-s-triazine) was scarcely retained in this nickel compound.

Figure 2:
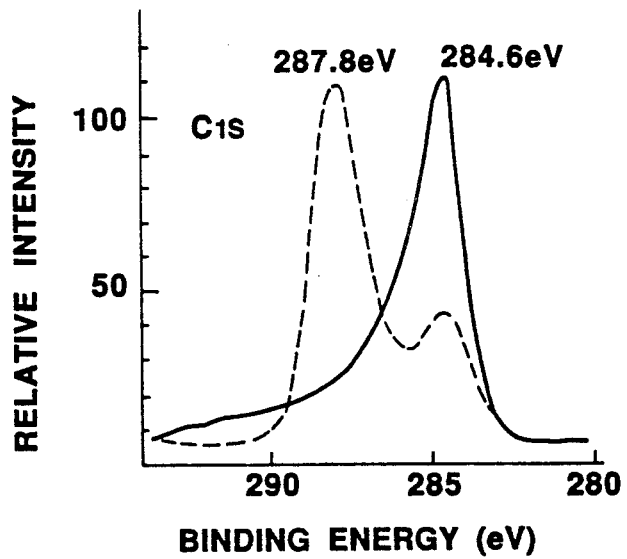
FIGS. 2 to 4 show ESCA spectra of the same nickel compound and poly(amino-s-triazine) from which the nickel compound is derived.
Figure 3:
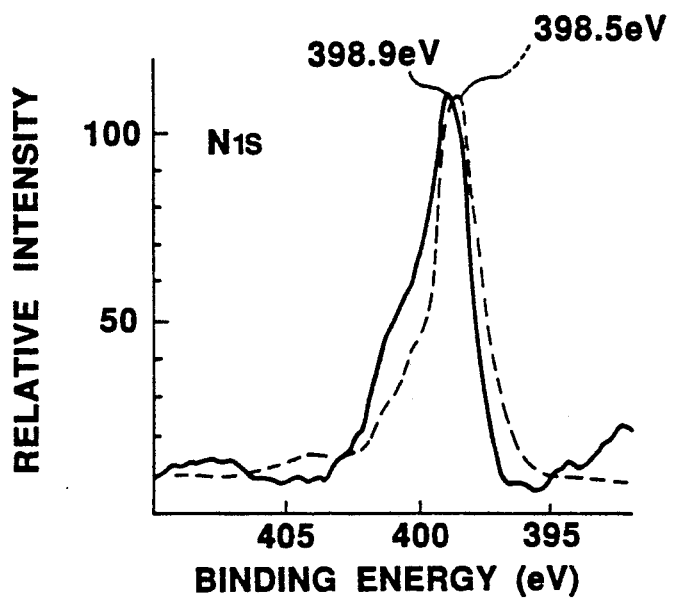
Figure 4:
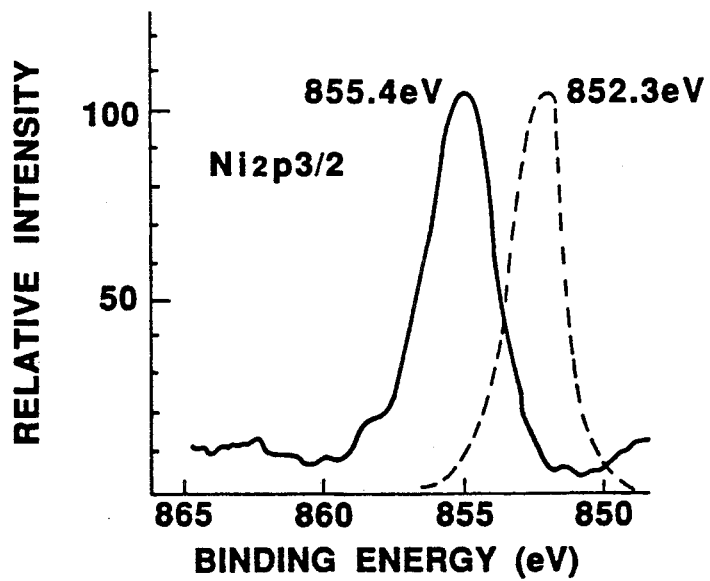

FIGS. 2, 3 and 4 show ESCA spectra of the nickel compound (curve in solid line in each chart) and the starting poly(amino-s-triazine) (curve in broken line in each chart). The $C_{1s}$ spectra of FIG. 2 show that the peak at 287.8 eV characteristic of poly(amino-s-triazine) disappeared by the reaction of the polymer with nickel and that the reaction augmented the peak at 284.6 eV characteristic of amorphous graphite. With respect to the nickel compound the $N_{1s}$ spectrum of FIG. 3 has a high peak at 398.9 eV and a shoulder on the higher energy side of the peak and, hence, indicates the existence of two groups of nitrogen atoms different in bonds. The $Ni_{2p}3/2$ spectra of FIG. 4 show a shift of the peak at 852.3 eV characteristic of metallic Ni toward the higher energy side and, hence, indicates that in the obtained compound Ni is deprived of an electron by bonding to a different atom higher in electronegativity, viz. N or C. From the integrated intensity ratio of these ESCA spectra the composition of the nickel compound was deduced to be $C_{6.7}NNi_{0.17}$, which was in good agreement with the result of elementary analysis.

From the above described results of analysis we can presume that the structure of the nickel compound in the form of black powder is fundamentally similar to that of amorphous graphite, that in this compound a portion of carbon atoms of graphite are substituted by nitrogen atoms and that a small quantity of nickel atoms have entered the graphite-like structure each to bond to a nitrogen or carbon atom.

EXAMPLE 2

The reaction in Example 1 was modified only in the following two points. Instead of the direct contact of the nickel sheet with poly(amino-s-triazine) in powder form, the polymer was sublimated to allow only the vapor of the polymer to make contact with the nickel sheet, and the reaction temperature was changed to 630° C.

In this case the reaction product was in the form of a black and glossy film adhered to the nickel sheet. The film was high in acid resistance. That is, the film exhibited no change by treatment with either dilute nitric acid or concentrated nitric acid. A tiny specimen was cut from the nickel sheet laid with the black film, and the specimen was kept immersed in dilute nitric acid for one week. The nickel sheet in the specimen completely dissolved in the acid, whereas the black film remained unchanged. By elementary analysis the thus separated film proved to be of the same nickel compound as the product of Example 1. The film exhibited paramagnetism. By observation with SEM the film was about 1 μm in thickness and had a fairly tight structure, though some small regions of the film seemed to be agflomeration of fine particles. It will be possible to form a film of a still better structure by varying the reaction condition.

EXAMPLE 3

A mixture of 1.0 g of nickel powder having a mean particle size of 5 μm and 7.4 g of the poly(amino-s-triazine) powder used in Example 1 was subjected to reaction in a nitrogen gas stream at a temperature of 650° C. for 30 min. The product of the reaction was 2.6 g of a black powder. This powder exhibited magnetism, though the magnetism was weaker than that of the nickel powder.

Figure 5:
FIG. 5 is a SEM photograph of a powder of a nickel compound according to the invention.

X-ray diffraction chart of the obtained powder exhibited diffraction by metallic nickel and a broad peak at the position of the (002) diffracted line of graphite. The whole quantity of the powder was kept immersed in 2N nitric acid for about 24 hr, but 2.3 g of the powder remained undissolved. After this acid treatment there was no change in the X-ray diffraction pattern of the powder. For comparison, the treatment of the nickel powder before the reaction with the same nitric acid resulted in complete dissolution of the powder. From these facts it is deduced that each particle of the black powder obtained by the reaction has a core of metallic nickel in a crust of the same nickel compound as the product of Example 1. FIG. 5 is a SEM photograph of the black powder. In the photograph it is seen that whiskers having diameters of 0.05–0.5 μm have closely grown on a metal surface. These whiskers are of the acid resistant compound formed by the reaction of nickel powder with poly(amino-s-triazine).

EXAMPLE 4

A mixture of 1 g of reduced iron powder having a mean particle size of 5 μm and 3 g of the poly(amino-s-triazine) powder used in Example 1 was subjected to reaction in a nitrogen gas stream at a temperature of 630° C. for 1 hr. The product of the reaction was 1.5 g of a brown powder. Elementary analysis of this powder gave the result shown in Table 1. This powder exhibited ferromagnetism and in this regard was almost comparable to the iron powder used as the reactant. X-ray diffraction chart of this powder exhibited diffraction by metallic iron and a broad peak at the position of the (002) diffracted line of graphite.

Figure 8:
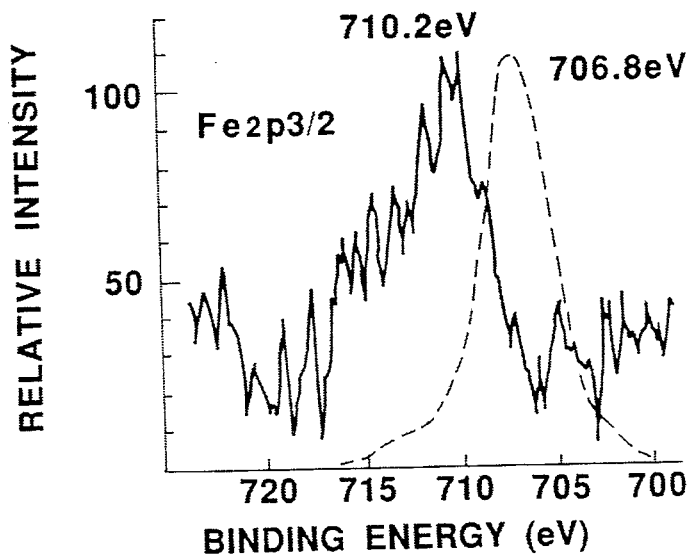
FIGS. 6 to 8 show ESCA spectra of an iron compound according to the invention and poly(amino-s-triazine) from which the iron compound is derived.
Figure 6:
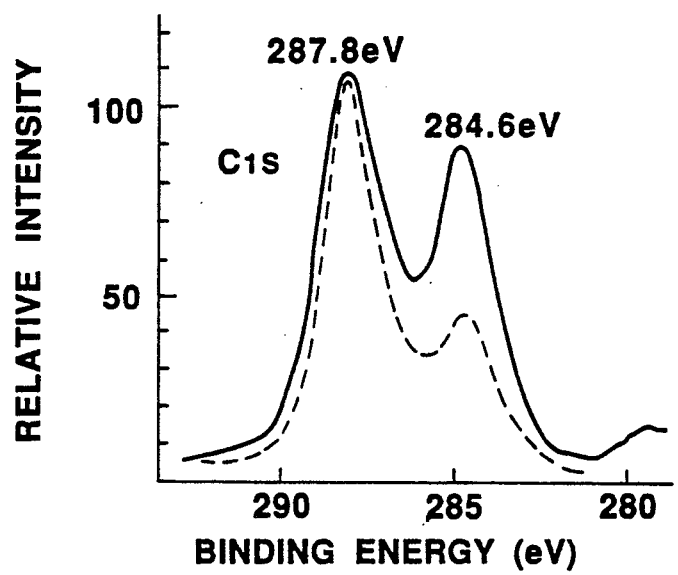
Figure 7:
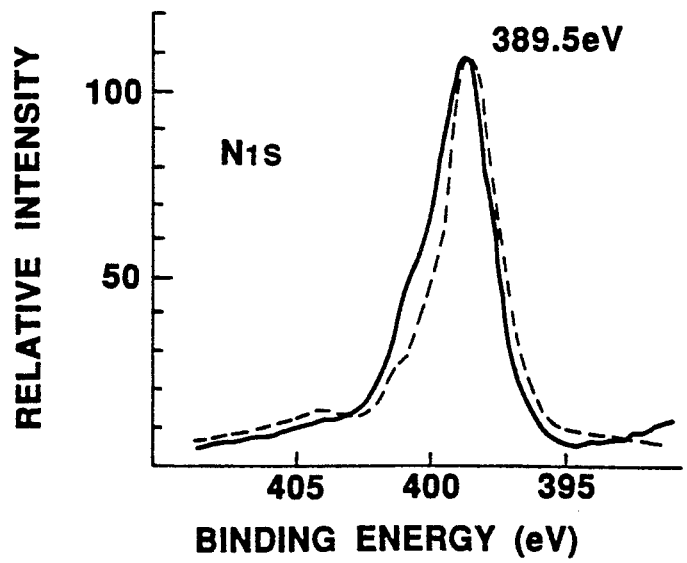

FIGS. 6, 7 and 8 show ESCA spectra of the brown powder obtained as the reaction product (curve in solid line in each chart) and poly(amino-s-triazine) before the reaction (curve in broken in each chart). With respect to the reaction product, the $C_{1s}$ spectrum of FIG. 6 exhibits a peak at 287.8 eV attributed to carbon of s-triazine ring. So, it is evident that s-triazine rings of the starting polymer remain in the reaction product. The $N_{1s}$ spectra of FIG. 7 indicate that the reaction did not produce a significant change in the state of nitrogen atoms. The $Fe_{2p}3/2$ spectra of FIG. 8 show a shift of the peak characteristic of metallic Fe toward the higher energy side and, hence, indicate that in the reaction product Fe atom bonds to N atom or C atom.

From the above results of analysis it is deduced that the reaction product is a mixture of poly(amino-s-triazine) and a new graphite-like compound with substitution of nitrogen atoms for some of carbon atoms and with intrusion of small quantity of iron atoms into the graphite-like structure each to bond to a nitrogen atom or a carbon atom. Besides, there is a possibility that some of the iron atoms of the new compound have entered the aforementioned holes in the two-dimensional structure of poly(amino-s-triazine).

To test the acid resistance of the brown powder obtained in this example, 1.5 g of the powder was kept immersed in 2N nitric acid for about 24 hr. By this treatment the weight of the powder decreased to 0.5 g, and the color of the powder changed from brown to green. Besides, the acid treatment caused a change in the magnetic property of the powder: after the treatment the powder exhibited paramagnetism.

EXAMPLE 5

Together with 1 g of poly(amino-s-triazine) used in Example 1, a strip of a stainless steel sheet (SUS 304, containing 8.0–10.5 wt % Ni and 18.0–20.0 wt % Cr) 4 cm in length, 1 cm in width and 200 μm in thickness was heated in a nitrogen gas stream at a temperature of 650° C. for 1 hr. As the result a semitransparent film having a brownish to purplish color was formed on the surface of the stainless steel sheet. ESCA spectra of this film were similar to the ESCA spectra of the brown powder formed in Example 4. The film proved to contain Fe, but neither Ni nor Cr was detected.

TABLE 1

| Compound | Elementary Analysis (wt %) | | | | Composition |
| --- | --- | --- | --- | --- | --- |
| | C | N | H | M | |
| poly(amino-s-triazine) | 34.8 | 62.8 | 2.3 | 0 | $C_{0.65}NH_{0.52}$ |
| Example 1 | 67.0 | 12.1 | 0.6 | 7.0 (Ni) | $C_{6.5}NH_{0.7}Ni_{0.14}$ |
| Example 4 | 37.9 | 43.2 | 2.0 | 3.5 (Fe) | $C_{1.0}NH_{0.6}Fe_{0.02}$ |
| Example 5 | 27.9 | 41.8 | 0.7 | 8.0 (Fe) | $C_{0.78}NH_{0.2}Fe_{0.05}$ |

In preparing a transition metal halide derivative of poly(amino-s-triazine) represented by the general formula (2), $C_6N_pH_qM_rX_s$, it is preferred to select Fe, Co, Ni or Cu as the transition metal and use a chloride such as $FeCl_2$, $CoCl_2$, $NiCl_2$ or $CuCl_2$, a bromide such as $FeBr_2$, $CoBr_2$, $NiBr_2$ or $CuBr_2$ or an iodide such as $FeI_2$, $CoI_2$, $NiI_2$ or $CuI_2$. In any case the transistion metal halide may be in the form of a hydrate.

For the reaction a powder of poly(amino-s-triazine) is mixed with a powder of a selected transition metal halide, and the mixture is heated in an inactive gas such as nitrogen at a temperature in the range from 200° to 500° C. In this reaction it is suitable to use from 0.8 to 2.0 mols of transition metal halide per 201 g of poly(amino-s-triazine). (The basis of "201 g" is $(C_3N_3)_2(NH)_3$, which represents an ideal composition.) If the amount of the metal halide is less than 0.8 mol a considerable portion of poly(amino-s-triazine) remains unreacted. If the amount of the metal halide exceeds 2.0 mols a considerable portion of the metal halide remains unreacted and cannot easily be removed from the reaction product. It is preferred to use 0.9-1.5 mol of the metal halide per 201 g of poly(amino-s-triazine).

A compound represented by the general formula (2) is stable up to a temperature of about 500° C. If this compound is further heated the compound gradually liberates a portion of its carbon and nitrogen as the temperature rises, and the skeleton of poly(amino-s-triazine) partly changes into a metal containing graphite-like structure. In the thus formed graphite-like substance the transition metal probably remains as a substituent for some of carbon atoms of graphite structure. This is deduced from the facts that X-ray diffraction pattern exhibits a peak at the position of the (002) diffracted line of graphite, that IR absorption spectrum does not show distinct absorptions and that ESCA spectrum shows a shift of the position of a peak attributed to the transition metal. The metal containing graphite-like substance exhibits magnetism.

EXAMPLE 6

A mixture of 1.0 g of a powder of poly(amino-s-triazine) and 0.70 g of a powder of $NiCl_2$ was put in a dish, and the dish was placed in a reaction tube made of quartz. The temperature in the reaction tube was gradually raised while nitrogen gas was passed through the tube. When the temperature reached about 120° C. the occurrence of a reaction was detected by finding the generation of HCl gas from IR absorption spectra of the gases discharged from the reaction tube. As the temperature reached about 300° C. the reaction became vigorous. The temperature was raised up to 500° C. In about 1 hr after that the generation of HCl gas almost ended.

The product of the above reaction was 1.10 g of a brown powder. In the air this powder was stable with little absorption of moisture.

Figure 9:
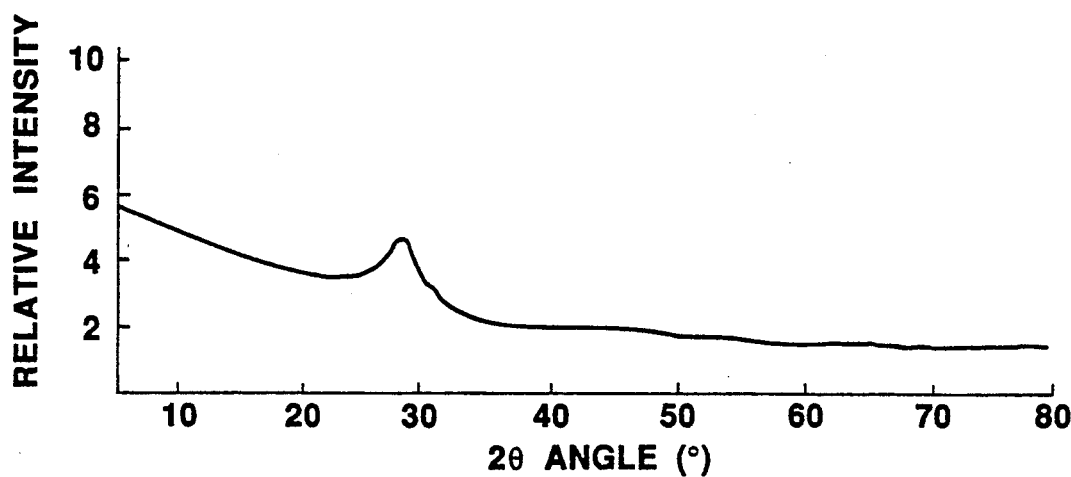
FIG. 9 shows X-ray diffraction pattern of a nickel chloride derivative of poly(amino-s-triazine)

Elementary analysis of the obtained powder gave the result shown in Table 2. FIG. 9 shows X-ray diffraction pattern of this powder. The diffraction pattern indicates that compared with the starting poly(amino-s-triazine) the reaction product does not significantly differ in the interlayer spacings since there is not a significant difference in the position of the (002) diffracted line, though it is seen that the reaction product is lower in crystallinity.

Figure 10:
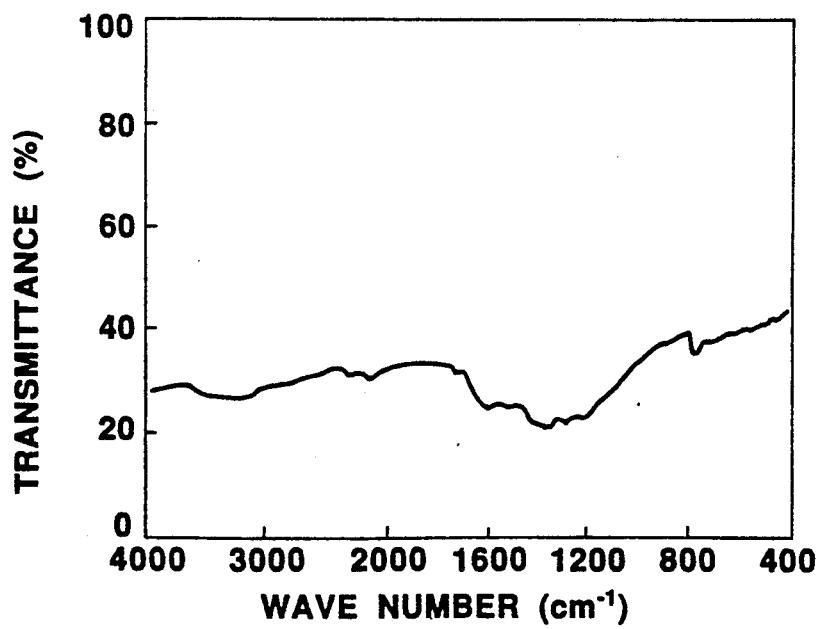
FIG. 10 shows IR absorption spectrum of the same derivative.

FIG. 10 shows IR absorption spectrum of the reaction product. This spectrum is almost similar to the absorption spectrum of poly(amino-s-triazine) and, hence, indicates that the reaction product retains the skeleton of the starting polymer. However, at 2186 $cm^{-1}$ there is a small absorption band indicative of stretching of C—N bond. Therefore, it is presumable that the structure of the starting polymer became locally disordered by partial decomposition during the reaction with the metal halide.

As mentioned hereinbefore, in the unit cell of the two-dimensional structure of poly(amino-s-triazine) there is a hole surrounded by three NH radicals. Since NH is high in reactivity it is probable that hydrogen of the >NH radicals surrounding the hole reacts with $NiCl_2$ to eliminate HCl and take Ni into the hole together with unreacted Cl. Such reaction will not significantly change the two-dimensional structure and interlayer spacings of poly(amino-s-triazine) though the structure will become slightly disordered. Thus, it is presumable that one molecule of $NiCl_2$ reacts with each unit cell of poly(amino-s-triazine). In fact, when the reactants are in such proportions the yield of the reaction product becomes best. In this example, the molar ratio of Ni to $(C_3N_3)_2(NH)_3$ was 0.9, which is close to 1.0.

EXAMPLES 7 AND 8

In place of 0.70 g of $NiCl_2$ in Example 6, 0.70 g of $CoCl_2$ was used in Example 7 and 0.65 g of $FeCl_2$ in Example 8. Except the change in this point the reaction of Example 6 was repeated by the same method and under the same conditions. In Example 7 the product was 1.07 g of a green powder. In Example 8 the product was 1.05 g of a brown powder. The results of elementary analysis were as shown in Table 2.

COMPARATIVE EXAMPLE 1

The reaction of Example 6 was modified only in that 3.0 g of $CuCl_2$ was used in place of 0.7 g of $NiCl_2$. The product of the reaction was 1.73 g of a brown powder. The result of elementary analysis is shown in Table 2. In this case the reaction product contained a large amount of Cu. By examination with ESCA and SEM it was evident that most of Cu in the reaction product was in the form of elementary copper particles.

TABLE 2

| | Elementary Analysis (wt %) | | | | | Composition |
| --- | --- | --- | --- | --- | --- | --- |
| | C | N | H | M | Cl | |
| Ex. 6 ($NiCl_2$) | 27.5 | 48.9 | 1.1 | 20.1 (Ni) | 1.2 | $C_6N_{9.1}H_{2.9}Ni_{0.9}Cl_{0.09}$ |

TABLE 2-continued

| | Elementary Analysis (wt %) | | | | | |
|---|---|---|---|---|---|---|
| | C | N | H | M | Cl | Composition |
| Ex. 7 (CoCl$_2$) | 28.5 | 51.2 | 1.2 | 16.4 (Co) | 1.9 | C$_6$N$_{9.3}$H$_{3.0}$Co$_{0.7}$Cl$_{0.1}$ |
| Ex. 8 (FeCl$_2$) | 28.0 | 50.5 | 1.2 | 18.9 (Fe) | 2.1 | C$_6$N$_{9.3}$H$_{3.1}$Fe$_{0.9}$Cl$_{0.2}$ |
| Comp. Ex. 1 (CuCl$_2$) | 8.5 | 13.8 | 0.7 | 51.0 (Cu) | 19.5 | C$_6$N$_{8.4}$H$_{6.1}$Cu$_{6.8}$Cl$_{4.8}$ |

In preparing an aluminum salt derivative of poly(amino-s-triazine) represented by the general formula (3), C$_6$N$_p$H$_q$Al$_r$X$_s$ (X is an acid radical), it is preferred to use AlCl$_3$, AlBr$_3$, AlI$_3$ or Al$_2$(SO$_4$)$_3$ as the aluminum salt. The aluminum salt may be in the form of a hydrate.

For the reaction a powder of poly(amino-s-triazine) is mixed with a powder of a selected aluminum salt, and the mixture is heated in an inactive gas such as nitrogen at a temperature in the range from 200° to 500° C. In this reaction it is suitable to use from 0.8 to 2.0 mols of aluminum salt per 201 g of poly(amino-s-triazine). If the amount of the aluminum salt is less than 0.8 mol a considerable portion of poly(amino-s-triazine) remains unreacted. If the amount of the aluminum salt exceeds 2.0 mols a considerable portion of the aluminum salt remains unreacted and cannot easily be removed from the reaction product. It is preferred to use 0.9–1.5 mol of an aluminum salt per 201 g of poly(amino-s-triazine).

This reaction gives a compound represented by the general formula (3) in the form of a yellow powder. In the air the obtained powder is stable and hardly absorbs moisture. The results of X-ray diffraction analysis and IR absorption spectrum analysis indicate that the obtained compound retains the fundamental structure of poly(amino-s-triazine) and that Al is taken into the hole in the unit cell of poly(amino-s-triazine). The aluminum salt reacts with hydrogen of the >NH radicals surrounding the aforementioned hole to form an acid, whereby most of the acid radical of the aluminum salt is lost. However, a small portion of the acid radical remains unreacted and enters the aforementioned hole together with Al.

By subjecting a powder of a compound represented by the general formula (3) to a heat treatment in an inactive gas atmosphere at a temperature ranging from 800° to 950° C., the powder turns into a white or grayish powder. By X-ray diffraction analysis this powder is an AlN powder. Although the X-ray diffraction pattern does not show the existence of any organic matter, elementary analysis and IR absorption spectrum analysis of the same powder evidence the existence of an organic substance together with aluminum nitride. Therefore, it is certain that the obtained AlN powder is coated with an amorphous organic substance composed of C, N and H. In this organic substance the atomic ratio of N to C is up to 1.5, and the atomic ratio of H to C is up to 1.0. If the heat treatment is made at a temperature lower than 800° C. (but higher than 500° C.) crystalline AlN does not form, though the graphite-like structure of the compound of the general formula (3) is destructed. If the heat treatment is made at a temperature above 950° C. the amorphous organic coating decomposes and dissipates, so that the product is an ordinary AlN powder.

Another way to obtain an AlN powder coated with the amorphous organic substance is reacting poly(amino-s-triazine) with an aluminum salt in an inactive gas atmosphere at a temperature in the range from 800° to 950° C.

EXAMPLE 9

A mixture of 1.0 g of a powder of poly(amino-s-triazine) and 0.66 g of a powder of AlCl$_3$ was put in a dish, and the dish was placed in a reaction tube made of quartz. In an electric furnace the temperature in the reaction tube was gradually raised while nitrogen gas was passed through the tube. When the temperature reached about 120° C. the occurrence of a reaction was detected by finding the generation of HCl gas from IR absorption spectra of the gases discharged from the reaction tube. As the temperature reached about 300° C. the reaction became vigorous. The temperature was raised up to 500° C. In about 3 hr after that the generation of HCl gas almost ended.

The product of the above reaction was 1.22 g of a yellow powder. The yellow color of this powder was deeper than that of the starting poly(amino-s-triazine) powder. In the air this powder was stable with little absorption of moisture.

Figure 11:
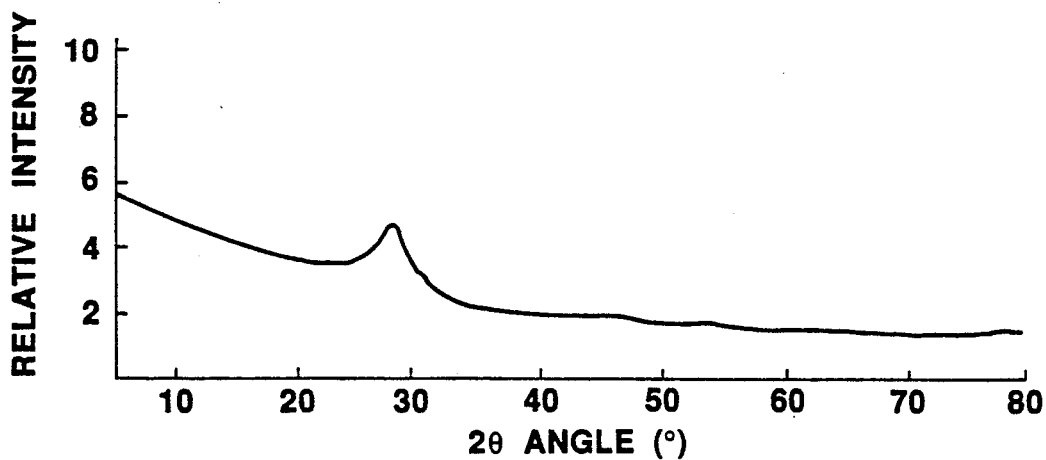
FIG. 11 shows X-ray diffraction pattern of an aluminum chloride derivative of poly(amino-s-triazine)

Elementary analysis of the obtained powder gave the result shown in Table 3. FIG. 11 shows X-ray diffraction pattern of this powder. The diffraction pattern indicates that compared with the starting poly(amino-s-triazine) the reaction product does not significantly differ in the interlayer spacings since there is not a significant difference in the position of the (002) diffracted line, though it is seen that the reaction product is lower in crystallinity.

Figure 13:
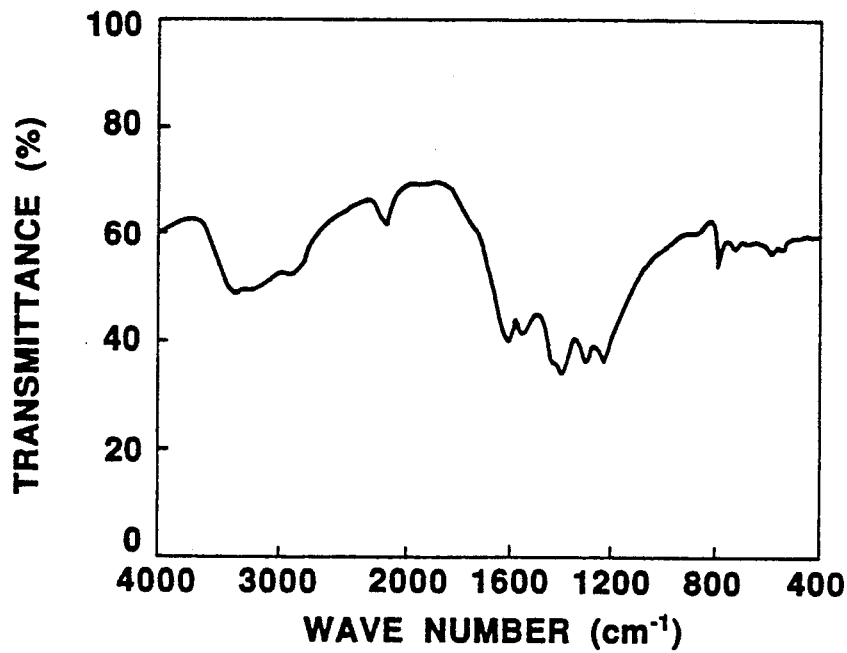
FIG. 13 shows IR absorption spectrum of the same derivative.

FIG. 13 shows IR absorption spectrum of the reaction product. This spectrum is almost similar to the absorption spectrum of poly(amino-s-triazine) and, hence, indicates that the reaction product retains the skeleton of the starting polymer. However, the absorption at 2186 cm$^{-1}$ indicates stretching of C—N bond, and the absorption at 2980 cm$^{-1}$ indicates stretching of C—H bond. Therefore, it is presumable that the structure of the starting polymer became locally disordered by partial decomposition during the reaction with aluminum chloride.

The mechanism of the reaction is presumed to be as described hereinbefore with respect to the reaction of poly(amino-s-triazine) with a transition metal halide. Also in this case it is presumable that one molecule of AlCl$_3$ reacts with each unit cell of poly(amino-s-triazine). In fact, when the reactans are in such proportions the yield of the reaction product becomes best. In this example, the molar ratio of Al to (C$_3$N$_3$)$_2$(NH)$_3$ was 0.9, which is close to 1.0.

EXAMPLE 10

The reaction of Example 9 was repeated, and after the 3-hr reaction at 500° C. the temperature in the reaction tube was further raised up to 900° C. As the temperature reached about 600° C. a whitish powder was formed in a relatively low temperature section of the electric furnace, and a black powder was formed in the same section when the temperature reached about 800° C. The ultimate temperature of 900° C. was maintained for 3 hr.

Figure 12:
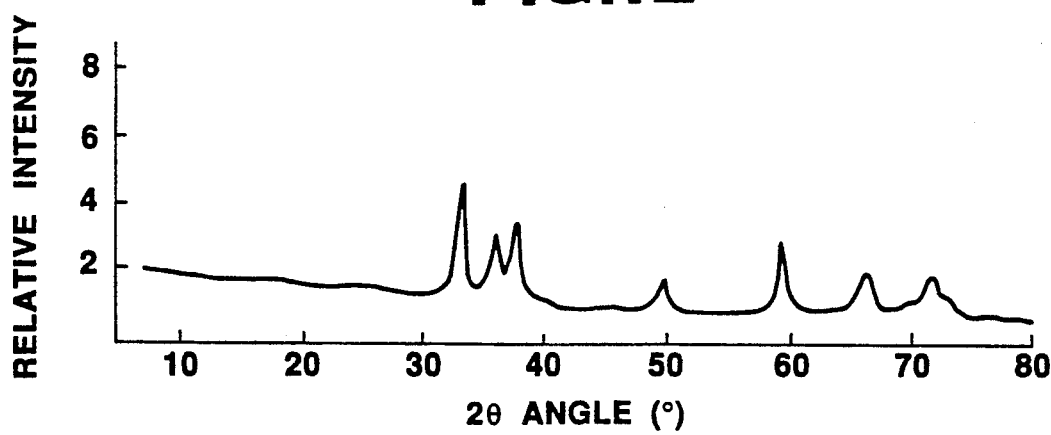
FIG. 12 shows X-ray diffraction pattern of an aluminum nitride powder obtained by heat treatment of the aluminum chloride derivative.
Figure 14:
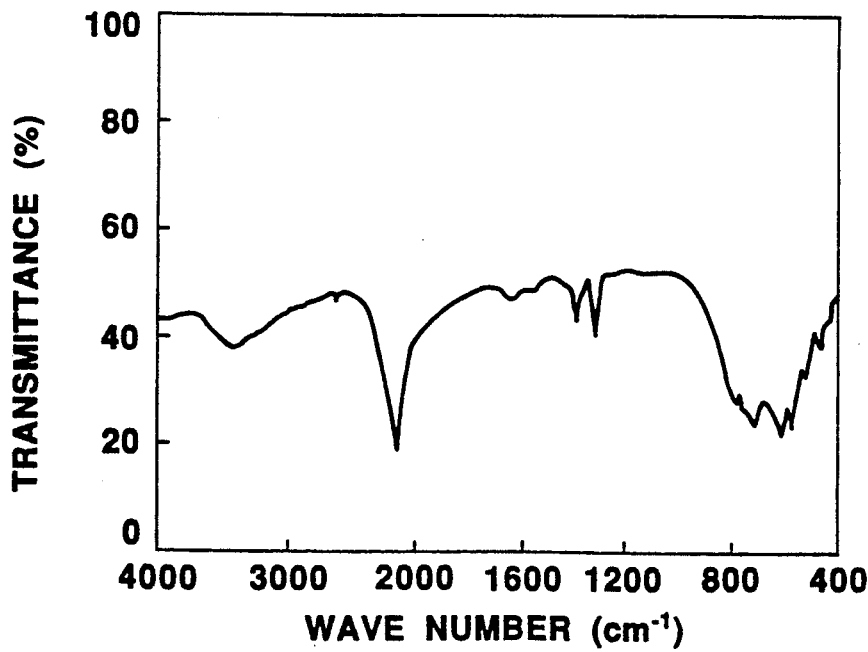
FIG. 14 shows IR absorption spectrum of the same powder.

The product of the reaction at 900° C. was 0.30 g of a grayish white powder. This powder was stable in the air. The result of elementary analysis is shown in Table 3. It is seen that the reaction resulted in little loss of Al of AlCl$_3$ subjected to the reaction. FIG. 12 shows X-ray diffraction pattern of the obtained powder. This diffraction pattern agrees with that of AlN. The result of elementary analysis indicates the coexistence of a considerable amount of carbon, an excess of nitrogen and a small amount of hydrogen, but the X-ray diffraction pattern does not exhibit any peak attributed to an organic compound. Therefore, it is presumable that the powder contains an amorphous organic substance. FIG. 14 shows IR absorption spectrum of the obtained powder. This absorption spectrum utterly differs from that of poly(amino-s-triazine). The absorption peaks in this chart proved to be related to C, N and/or H, whereas the absorption spectrum hardly exhibits absorption peaks attributed to AlN. Therefore, it is reasonable to deduce that the product of the reaction at 900° C. is an AlN powder coated with an amorphous organic substance composed of C, N and H.

For confirmation, the obtained powder was subjected to a heat treatment at 1000° C., and elementary analysis was made after the heat treatment. The result is shown in Table 3. The heat treatment caused sublimation and decomposition of the organic coating, whereby only AlN in powder form was left.

TABLE 3

| | Elementary Analysis (wt %) | | | | | |
|---|---|---|---|---|---|---|
| | C | N | H | Al | Cl | Composition |
| Ex. 9 (500° C.) | 28.6 | 52.6 | 3.3 | 9.6 | 4.0 | $C_6N_{9.5}H_{8.4}Al_{0.9}Cl_{0.3}$ |
| Ex. 10 (900° C.) | 14.6 | 41.9 | 0.36 | 39.0 | 0 | $Al_{1.0}C_{0.84}N_{2.1}H_{0.25}$ |
| after heating at 1000° C. | 0.7 | 32.0 | 0.1 | 65.0 | 0 | AlN |

COMPARATIVE EXAMPLE 2

A mixture of 1 g of melamine and 0.66 g of $AlCl_3$ was subjected to reaction by the same method and under the same conditions as in Example 9. When the temperature was raised to about 300° C. the mixture of the reactants melted with generation of bubbles, and the melted mixture turned into a brown substance. As the temperature was further raised up to 500° C. the brown substance turned into a black substance withoug forming AlN powder.

$MgCN_2$ or $ZnCN_2$ can be prepared by reaction of poly(amino-s-triazine) with elementary Mg or Zn or with a magnesium or zinc halide. As the halide it is suitable to use $MgCl_2$, $MgBr_2$, $MgI_2$, $ZnCl_2$, $ZnBr_2$ or $ZnI_2$. The halide may be in the form of a hydrate. In the case of preparing $MgCN_2$ it is preferable to use a halide because magnesium halides are higher in reactivity than elementary magnesium.

For the reaction a powder of poly(amino-s-triazine) is mixed with a powder of the selected metal or metal halide, and the mixture is heated in an inactive gas such as nitrogen at a temperature in the range from 600° to 1000° C., and preferably in the range from 800° to 950° C. In this reaction it is suitable to use from 0.8 to 2.0 mols of Mg or Zn or a halide of the metal per 201 g of poly(amino-s-triazine). If the amount of the metal or its halide is less than 0.8 mol a considerable portion of poly(amino-s-triazine) remains unreacted. If the amount of the metal or its halide is more than 2.0 mols a considerable portion of the metal or its halide remains unreacted and cannot easily be removed from the reaction product. It is preferred to use 0.9–1.5 mol of the selected metal or its halide per 201 g of poly(amino-s-triazine).

When the mixture of the reactants is heated at a temperature lower than 600° C. but higher than 200° C., the product of the reaction is a compound having a layer structure with a structural unit represented by the general formula $C_6N_pH_qM_rX_s$, wherein M is Mg or Zn, X is a halogen, $8 \leq p \leq 10$, $0 \leq q \leq 10$, $0.6 \leq r \leq 1.5$, and $0 \leq s \leq 1$. When elementary Mg or Zn is used, s in the general formula becomes zero. This compoud retains the fundamental structure of poly(amino-s-triazine), and the metal or its halide enters the hole surrounded by three >NH radicals in the unit cell of poly(amino-s-triazine). In the case of using a halide as the metal source the reaction of the halide with hydrogen of NH results in dissipation of a portion of the halogen as a hydrogen halide, so that the content of the halogen in the reaction product is relatively small. In the air the obtained compound is stable with little absorption of moisture.

If the reaction temperature is made higher than 1000° C. the carbonitride formed by the reaction is liable to decompose.

By this method $MgCH_2$ is obtained as a white powder and $ZnCN_2$ as a grayish white powder. In either case the obtained powder is stable in the air and also in water, but the powder is decomposed by an acid.

EXAMPLE 11

A mixture of 1.0 g of a powder of poly(amino-s-triazine) and 0.33 g of Zn powder was put in a dish, and the dish was placed in a reaction tube made of quarts. The mixture in the reaction tube was kept heated at 900° C. for 1 hr while nitrogen gas was passed through the tube.

Figure 15:
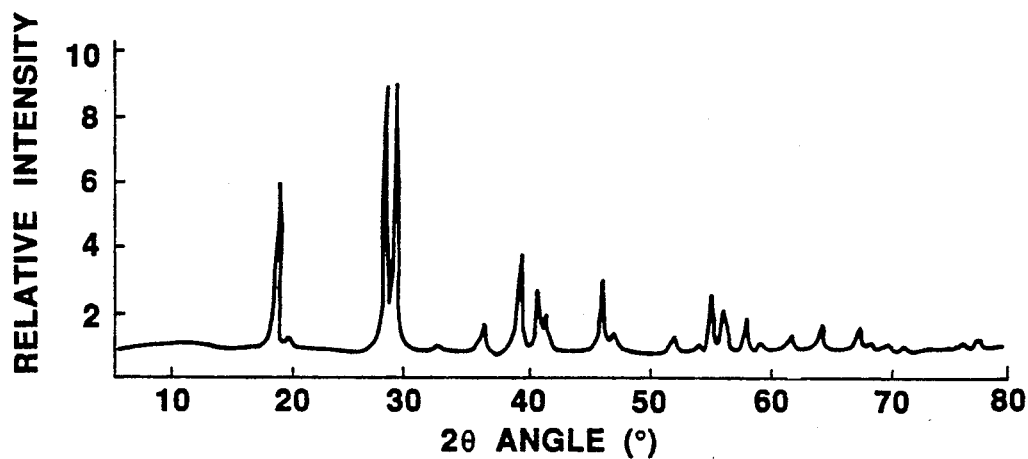
FIG. 15 shows X-ray diffraction pattern of a zinc carbonitride powder prepared by a method according to the invention.
Figure 17:
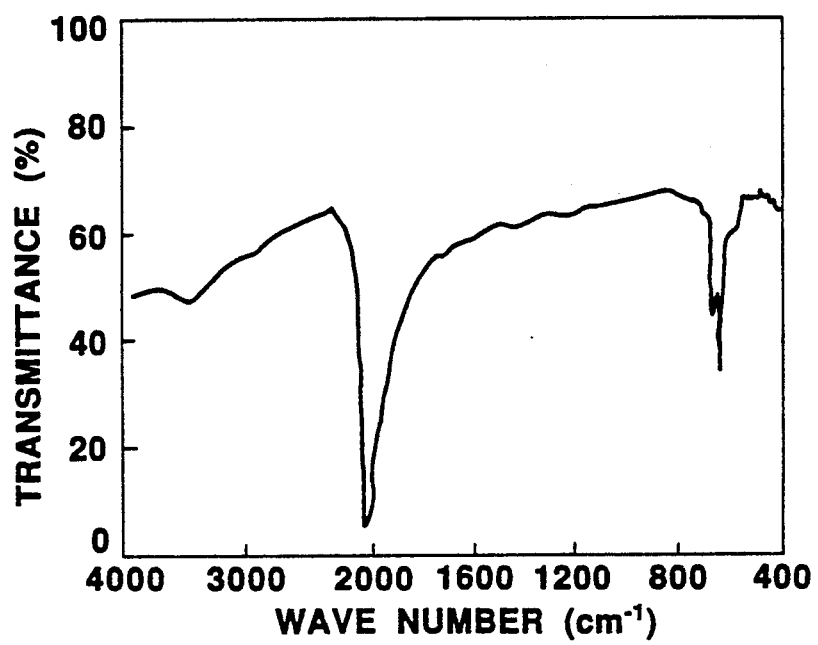
FIG. 17 shows IR absorption spectrum of the same powder.

The product of the above reaction was 0.28 g of a grayish white powder. In the air the powder was stable and hardly absorbed moisture. Elementary analysis of the obtained powder gave the result shown in Table 4. FIG. 15 shows X-ray diffraction pattern of this powder. Referring to X-ray spectra shown in JCPDS cards, the diffraction pattern of FIG. 15 is judged to indicate the chemical structure of $ZnCN_2$. FIG. 17 shows IR absorption spectrum of the same powder. The sharp absorption peak at 2048 cm$^{-1}$ is attributed to stretching vibrations of $-C\equiv N$ and $=N-C\equiv N$, and the sharp absorption peak at about 700 cm$^{-1}$ is presumed to be attributed to deformation vibrations of the same bonds. These absorptions agree with the results of X-ray diffraction analysis and elementary analysis. Thus, the product of this example proved to be $ZnCN_2$.

EXAMPLE 12

Using the same apparatus as in Example 11, a mixture of 1.0 g of a powder of poly(amino-s-triazine) and 0.68 g of $ZnCl_2$ powder was subjected to reaction in a nitrogen gas stream at a temperature of 900° C. for 1 hr. The product of the reaction was 0.25 g of a grayish white powder. By analysis this powder proved to be of $ZnCN_2$.

EXAMPLE 13

Using the same apparatus as in Example 11, a mixture of 0.3 g of a powder of poly(amino-s-triazine) and 0.14 g of $MgCl_2$ powder was subjected to reaction in a nitrogen gas stream at a temperature of 900° C. for 1 hr. The product of the reaction was 0.04 g of a white powder. In the air this powder was stable and hardly absorbed moisture.

Figure 16:
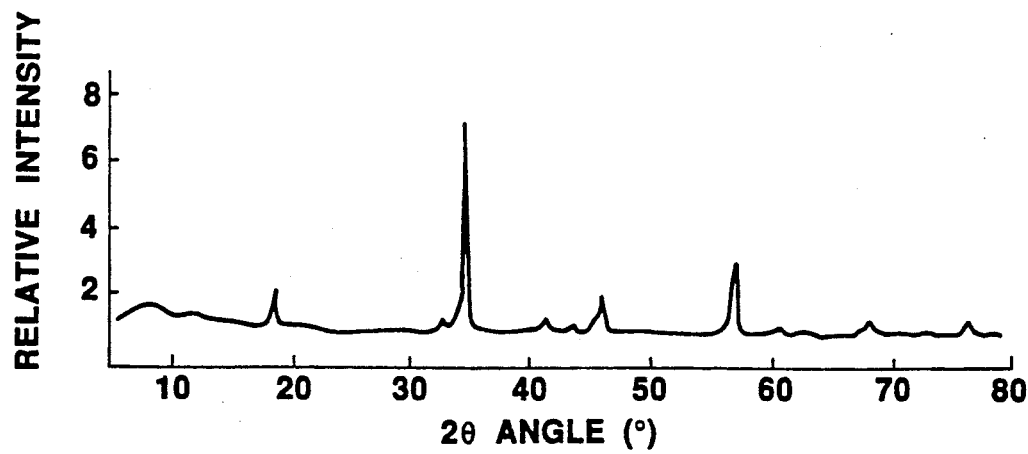
FIG. 16 shows X-ray diffraction pattern of a magnesium carbonitride powder prepared by a method according to the invention.
Figure 18:
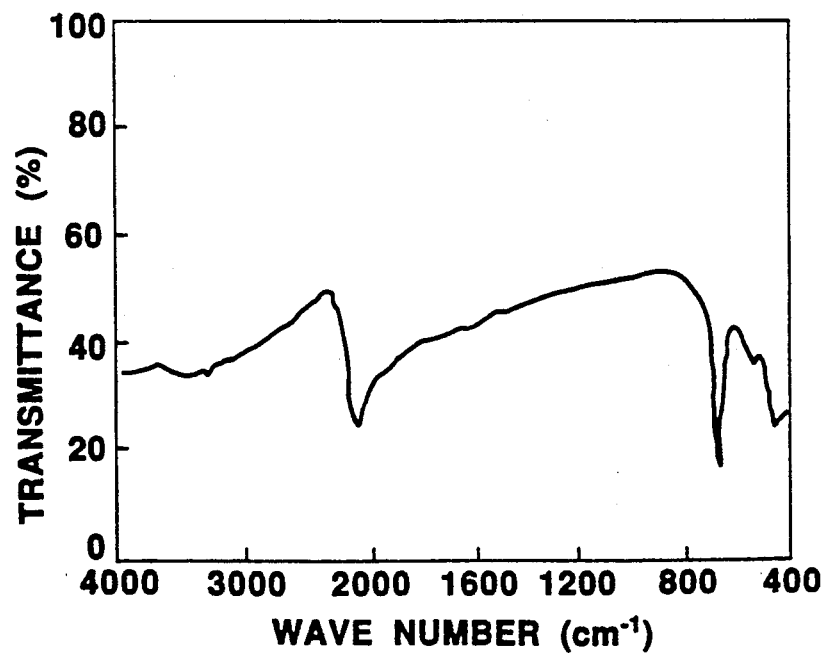
FIG. 18 shows IR absorption spectrum of the same powder.

Elementary analysis of the obtained powder gave the result shown in Table 4. FIG. 16 shows X-ray diffraction pattern of this powder. X-ray spectral data corresponding to this diffraction pattern could not be found in JCPDS cards. FIG. 18 shows IR absorption spectrum of the same powder. This IR spectrum too exhibits sharp absorption peaks at 2048 cm$^{-1}$ and at about 700 cm$^{-1}$ and, hence, indicates the existence of —C≡N and =N—C≡N bonds. From the results of IR absorption analysis and elementary analysis the product of this example could be judged to be $MgCN_2$. A small amount of hydrogen was detected by elementary analysis, but probably this is because of adhesion of hydrogen contained in the starting polymer to $MgCN_2$ formed by the reaction.

TABLE 4

| | Elementary Analysis (wt %) | | | | Composition |
|---|---|---|---|---|---|
| | C | N | H | Mg or Zn | |
| Ex. 11 | 11.5 | 27.4 | 0 | 56.5 (Zn) | $ZnC_{1.1}N_{2.3}$ |
| Ex. 12 | 12.0 | 26.9 | 0.1 | 56.3 (Zn) | $ZnC_{1.2}N_{2.2}H_{0.1}$ |
| Ex. 13 | 17.1 | 40.4 | 0.5 | 35.0 (Mg) | $MgC_{1.0}N_{2.0}H_{0.4}$ |

What is claimed is:

1. A compound having a layer structure with a structural unit of each layer represented by the formula (1), $$(C_3N_3)_2N_\alpha H_\beta M_\gamma \tag{1}$$

wherein ($C_3N_3$) represents the ring of s-triazine; M is a transition metal selected from the group consisting of Ni, Co and Mn; $2 \leq \alpha \leq 4$, $0 \leq \beta \leq 8$, and $0.008 \leq \gamma \leq 5$; and the transition metal atoms are bonding to the atoms that constitute the rings of s-triazine, the compound being formed by reaction of poly(amino-s-triazine) which has a layer structure with a structural unit of each layer represented by the formula (A) with said transition metal, $$(C_3N_3)_2N_xH_y \tag{A}$$

wherein ($C_3N_3$) represents the ring of s-triazine; $2 \leq x \leq 4$, and $0 \leq y \leq 8$, in which the rings of s-triazine are linked to one another by =NH radicals, and the proportion of poly(amino-s-triazine) to the transition metal is 0.1:1 to 20:1, by weight.

2. A compound according to claim 1, which is in the form of a powder, each particle of said powder having a core of the transition metal M.

3. A compound having a layer structure with a structural unit of each layer represented by the formula (1A), $$(C_3N_3)_2N_\alpha H_\beta Fe_\gamma \tag{1A}$$

wherein ($C_3N_3$) represents the ring of s-triazine; $2 \leq \alpha \leq 4$, $0 \leq \beta \leq 9$, and $0.008 \leq \gamma \leq 5$, the compound being formed by reaction of poly(amino-s-triazine) which has a layer structure with a structural unit of each layer represented by the formula (A) with iron, $$(C_3N_3)_2N_xH_y \tag{A}$$

wherein ($C_3N_3$) represents the ring of s-triazine; $2 \leq x \leq 4$, and $0 \leq y \leq 8$, in which the rings of s-triazine are linked to one another by =NH radicals, and the proportion of poly(amino-s-triazine) to iron is 0.1:1 to 20:1, by weight.

4. The compound of claim 3, which when in the form of a powder, each particle of said powder has a core of Fe.

5. A compound having a layer structure with a structural unit of each layer represented by the formula (2), $$(C_3N_3)_2N_pH_qM_rX_s \tag{2}$$

wherein ($C_3N_3$) represents the ring of s-triazine; M is a transition metal selected from the group consisting of Fe, Co, Ni and Cu; X is a halogen selected from the group consisting of Cl, Br, and I; $2 \leq p \leq 4$, $0 \leq q \leq 10$, $0.6 \leq r \leq 1.5$, and $0 \leq s \leq 1$, the compound being formed by reaction of poly(amino-s-triazine) which has a layer structure with a structural unit of each layer represented by the formula (A) with a halide of a transition metal, $$(C_3N_3)_2N_xH_y \tag{A}$$

wherein ($C_3N_3$) represents the ring of s-triazine; $2 \leq x \leq 4$, $0 \leq y \leq 8$, in which the rings of s-triazine are linked to one another by =NH radicals, and the proportion of poly(amino-s-triazine) to the transition metal is 0.1:1 to 20:1, by weight.

6. A compound having a layer structure with a structural unit of each layer represented by the formula (3), $$(C_3N_3)_2N_pH_qAl_rX_s \tag{3}$$

wherein ($C_3N_3$) represents the ring of s-triazine; X is an acid radical selected from the group consisting of Cl, Br, I and $SO_4$; $2 \leq p \leq 4$, $0 \leq q \leq 10$, $0.6 \leq r \leq 1.5$, and $0 \leq s \leq 1$, the compound being formed by reaction of poly(amino-s-triazine) which has a layer structure with a structural unit of each layer represented by the formula (A) with an aluminum salt having said acid radical, $$(C_3N_3)_2N_xH_y \tag{A}$$

wherein ($C_3N_3$) represents the ring of s-triazine; $2 \leq x \leq 4$, and $0 \leq y \leq 8$, in which the rings of s-triazine are linked to one another by =NH radicals, the Al atoms in the formula (2) being each confined in a hole surrounded by three of said =NH radicals of said poly(amino-s-triazine), the acid radicals in the formula (2) being each confined in said hole together with an atom of Al, and the proportion of poly(amino-s-triazine) to aluminum is 0.1:1 to 20:1, by weight.

* * * * *